(No Model.) 4 Sheets—Sheet 1.

D. C. RIPLEY.
MANUFACTURE OF GLASSWARE.

No. 543,656. Patented July 30, 1895.

WITNESSES

INVENTOR
Daniel C. Ripley (No Model.) 4 Sheets—Sheet 3.

D. C. RIPLEY.
MANUFACTURE OF GLASSWARE.

No. 543,656. Patented July 30, 1895.

WITNESSES

INVENTOR
Daniel C. Ripley (No Model.) 4 Sheets—Sheet 4.
D. C. RIPLEY.
MANUFACTURE OF GLASSWARE.
No. 543,656. Patented July 30, 1895.
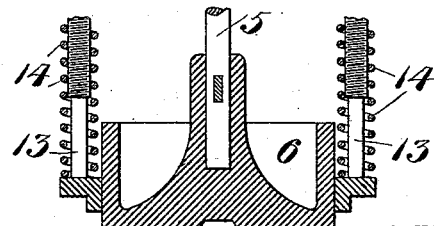
Fig. 5.
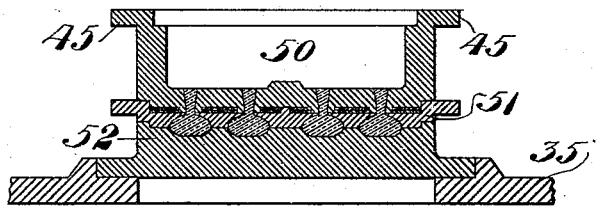
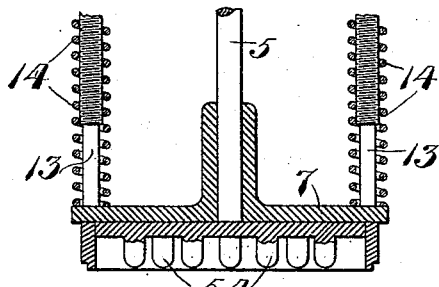
Fig. 6.
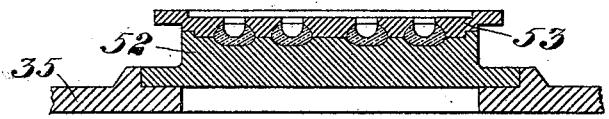
Fig. 7.
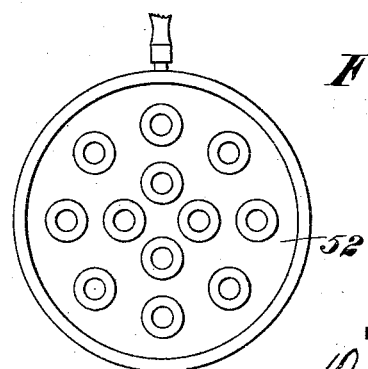
WITNESSES
James R. Bakewell
H. M. Corwin
INVENTOR
Daniel C. Ripley

UNITED STATES PATENT OFFICE.

DANIEL C. RIPLEY, OF PITTSBURG, PENNSYLVANIA.

MANUFACTURE OF GLASSWARE.

SPECIFICATION forming part of Letters Patent No. 543,656, dated July 30, 1895.

Application filed March 8, 1893. Renewed October 3, 1894. Serial No. 524,842. (No model.)

*To all whom it may concern:*

Be it known that I, DANIEL C. RIPLEY, of Pittsburg, in the county of Allegheny and State of Pennsylvania, have invented a new and useful Improvement in the Manufacture of Glassware, of which the following is a full, clear, and exact description.

My invention relates to an improvement in forming articles of glassware; and it consists in pressing a number of articles from a font into a mold having a number of cavities, separating the articles so formed from the font, and finishing the articles, as is hereinafter described.
In forming small articles of glassware—such as tumblers, buttons, salt-cellars, and other like articles — they have commonly been formed by pressing the articles one by one in a suitable mold, the operation of pressing the plastic glass in the mold being necessarily required to be performed at least once for each article formed.

The object of my invention is to enable a number of such articles to be formed by a single operation, or by a single series of operations where a series of operations would be required in forming one of the articles.

I will now describe my invention as it may be employed in the manufacture of tumblers and salt-cellars, so that others skilled in the art may employ the same, reference being had to the accompanying drawings, forming part of this specification, in which—

Figure 1:
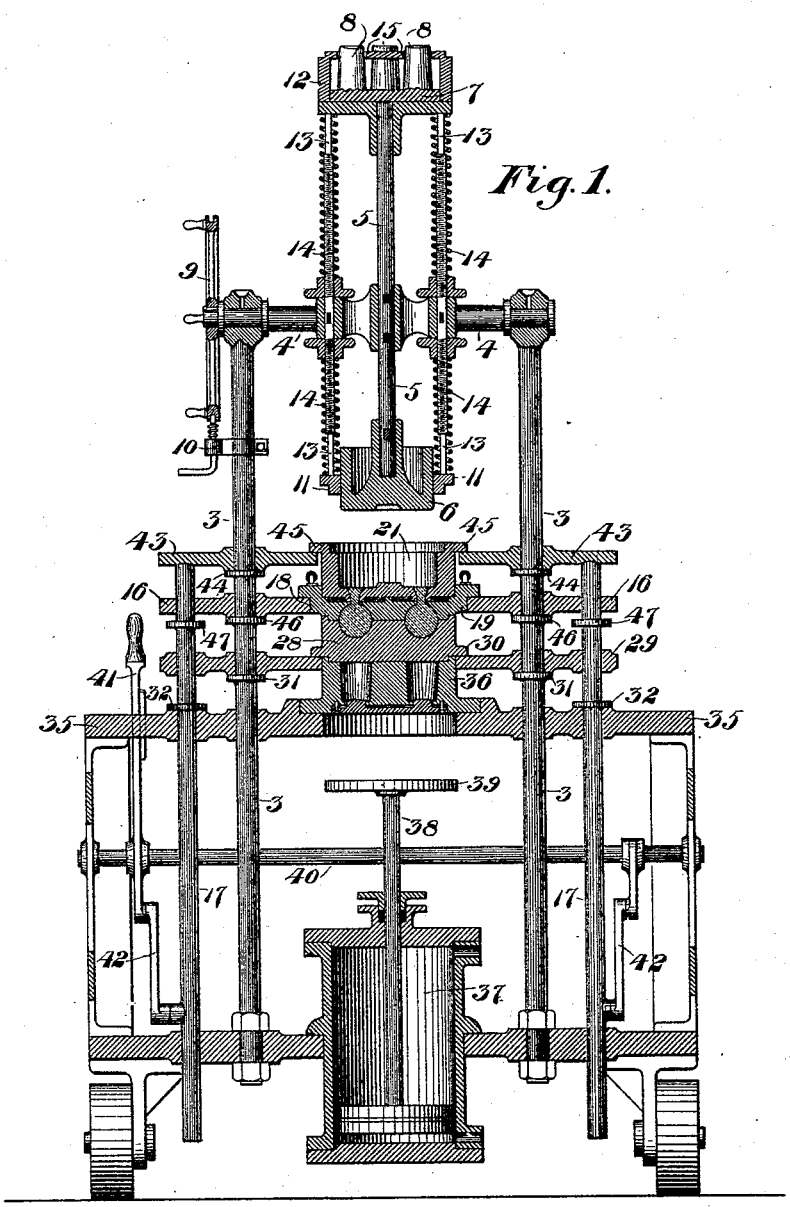
Figure 2:
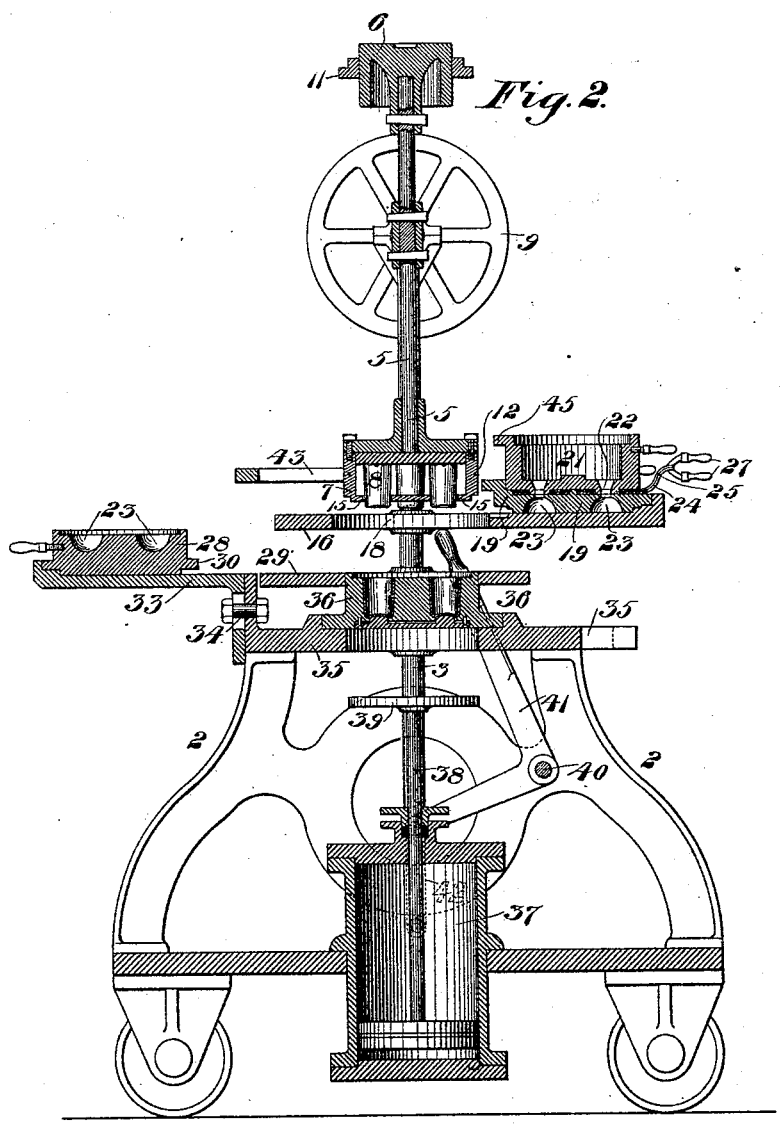
Figure 3:
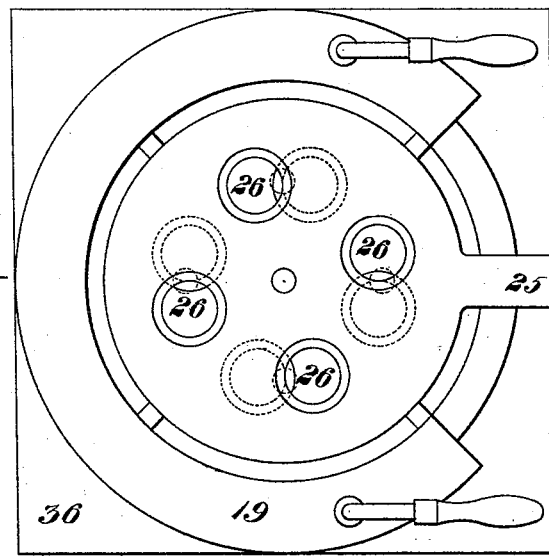
Figure 4:
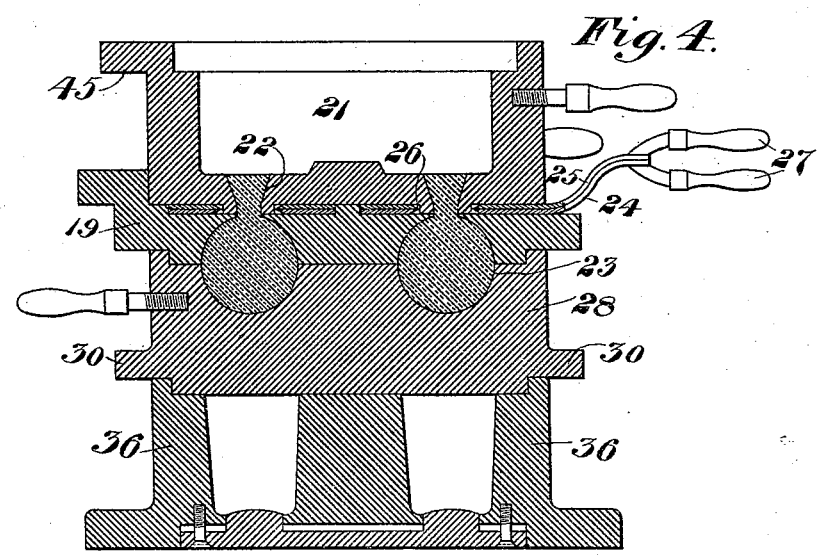

Figure 1 is a cross vertical sectional view of the machine and molds adapted for the manufacture of tumblers. Fig. 2 is a longitudinal vertical sectional view of the same. Fig. 3 is a plan view of the shears on the blank-mold. Fig. 4 is a vertical sectional view of the same. Fig. 5 is a vertical sectional view of the plunger, font, and mold for forming salt-cellar blanks. Fig. 6 is a view of the plunger and mold for pressing the salt-cellars from the blanks, and Fig. 7 is a plan view of the lower part of the salt-cellar mold.

Like symbols of reference indicate like parts in each.

In manufacturing articles such as tumblers, I first press a number of blanks from a mass of plastic glass placed in a font over a blank-mold, by means of a plunger, which is caused to enter the font and press the glass through apertures in the bottom thereof. I then separate the upper and lower parts of the blank-mold from each other and remove the lower part of the mold. The sprues between the font and the glass are then cut and the blanks are allowed to drop into the cavities of a tumbler-mold, in which the tumblers are pressed by suitable dies entering the cavities.

In the manufacture of salt-cellars and other articles where the bottom of the article is finished in the blank-mold, when the blanks have been formed by pressing the plastic glass through the apertures in the bottom of the font the sprues between the font and the blank are first cut and the font and upper part of the blank-mold are then removed from the blank, another upper part is substituted therefor, and the finished articles are pressed by suitable dies entering the cavities.

In the drawings I have shown molds and apparatus by means of which this method can be carried into effect in the manufacture of tumblers and salt-cellars, without, however, any intention of limiting my invention to this form of apparatus or to the kind of article to be produced.

Secured to the press or mold-table 2 are two vertical standards 3, at the top of which is the cross-head and shaft 4, which shaft is journaled in suitable bearings, so as to be capable of turning therein. Bolted or otherwise fixed to the shaft 4 is the plunger-rod 5, having at each end thereof a plunger-head 6 and 7, one of which 6 is plain or solid and is adapted to press the plastic glass from the font into the mold, while the other head 7 is provided with a number of dies 8, adapted to press the blanks in the cavities of the mold. Keyed to the outer end of the shaft 4 is a hand-wheel 9, by means of which the shaft 4 may be so turned in its bearings as to bring either one of these plunger-heads 6 or 7 in a vertical position below the shaft 4, and on the standards 3 is a catch 10, by means of which the hand-wheel and shaft are secured in position. Around the plunger-heads 6 and 7 are the caps or rings 11 and 12, which are supported by the rods 13, which are arranged to slide in recesses formed in the cross-head 4. Between the rings 11 and 12 and the cross-head 4, around the rods 13, are the spiral springs 14, which exert pressure on the rings when the rings are pushed back on the plunger-heads. Secured to the ring 12 is the bottom plate 15, having apertures through which the dies 8 extend.

Situate below the plunger-head 6 is a yoke 43, which rests upon the upper ends of the vertical reciprocating bars 17, without being attached thereto, the standards 3 passing loosely through collars in the yoke, so that a vertical movement may be imparted to the yoke by the rods 17. Below the yoke 43 on the standards 3 are the collars 44, arranged to engage with and support the yoke. This yoke is arranged to embrace the font 21 and engage with a collar 45 at the upper part thereof, so that the font may be raised by means of the rods 17.

Below the yoke 43 is a horizontal shelf 16, having collars which encircle the vertical reciprocating bars 17 and collars which encircle the standards 3. This shelf is supported by collars 46 on the standards 3. A short distance below this shelf on the rods 17 are the collars 47, by means of which a vertical movement may be imparted to the shelf, sliding it up and down on the standards 3. In the shelf 16, directly below the plunger-head 6, is an opening 18 for the reception of the upper part 19 of the blank-mold. In the upper face of this part 19 is a seat in which rests the font 21, in the bottom of which are a number of apertures 22, equal in number and coinciding with the blank-cavities 23 of the mold.

Situate between the adjacent faces of the font 21 and the part 19 of the blank-mold, are two thin metal plates 24 and 25, which may be pivoted together and are provided with apertures 26 corresponding with the apertures in the bottom of the font. These plates form shears for cutting the sprues between the font and mold, and are operated by turning the plates on their central pivot in opposite directions by means of the handles 27, which cause the edges of the apertures to pass each other and sever the sprues.

Below the part 19 of the blank-mold is the lower part 28 of the mold, having a seat in its upper face for the reception of the part 19, and mold-cavities which are continuations of the cavities in the part 19. The part 28 is supported on an opening in the shelf 29 by the annular ring 30. This shelf 29 is similar to the shelf 16, and is so supported on the standards 3 by the collars 31 that the shelf is capable of being moved upwardly on the standards. It is also provided with openings through which the rods 17 pass in such a manner that the rods may move freely in the openings, and so that the collars 32 on the rods 17 may engage with the shelf so as to raise the same when the rods 17 are elevated.

At one side of the movable shelf 29, and on a level therewith, is the stationary shelf 33, which is adjustably secured to the frame of the press by the bolts 34. Situate below the shelf 29 is the stationary table 35 having an annular opening, which is similar to and on a vertical line with the openings in the shelves 16 and 29, seated in which opening is the tumbler-mold 36, which is provided with cavities of the shape and size of the tumblers to be formed, which cavities are the same in number and relative position as the cavities in the blank-mold 19, 28. Secured to the frame of the press 2, and situate below the table 35 is a pneumatic cylinder 37, having a piston 38. This cylinder is connected with a supply of compressed air by which the piston is operated, suitable valves and ports being arranged for the operation of the piston. At the outer end of the piston-rod is a head 39 of slightly less diameter than that of the opening in the table 35 and shelves 29 and 16.

Below the table 35 and journaled in the frame 2 is the horizontal shaft 40, to which is keyed the hand-lever 41, to the bell-crank arm of which toggle-arms 42 are pivoted, the other arms of which toggle-arms are pivoted to the rods 17.

The operation of these parts is as follows: The tumbler-mold 36 being seated in the opening in the table 34 and the blank-mold sections 19 and 28 being seated over the tumbler-mold in the shelves 16 and 29, the required amount of plastic glass is placed in the font 21, which is then seated on top of the mold-section 19. The plunger 6 being fixed in the position shown in Fig. 1, air is admitted to the cylinder 37, below the piston 38, which causes the piston to ascend, and the head 39 coming in contact with the bottom of the mold 36 lifts this mold and the molds and font above it and carries the font 21 against the plunger 6, which enters the font, while the ring 11 is pushed back by the rim of the font, the function of the ring being to prevent any escape of glass over the rim of the font. The plastic glass in the font being thus carried against the plunger is forced down through the openings in the bottom of the font into the cavities in the blank-mold 19 28, filling the cavities and forming the blanks. This being done, the piston 38 is caused to descend and the molds, shelves, and font drop away from the plunger to their former position. The hand-lever 41 is then drawn forward, which raises the bars or rods 17 and thereby first lifts the font 21 a short distance—the fraction of an inch—from the mold-section 19, and then the collar 47 coming in contact with the shelf 16, the shelf, the font, and the mold-section are raised until the lower edges of the blanks are lifted out of and above the top of the mold-section 28. By a further movement of the lever 41, the collars 32, coming in contact with the mold-section 28, lift it out of its seat to a level with the stationary shelf 33, and it is then drawn back on the shelf to the position shown in Fig. 2. By means of the handles 27 the plates 24 and 25 are turned in opposite directions, which cuts the sprues between the blanks and the glass in the font and permits the blanks to drop into the cavities in the tumbler-mold 36. The font 21 and mold-section 28 are then drawn forward on the shelf 16 to the position shown in Fig. 2, the hand-wheel 9 is turned to bring the plunger-head 7 over the tumbler-mold, and air is admitted to the lower portion of the cylinder 37, which causes the piston 38 to carry the tumbler-mold up against the plunger, and the blanks in the cavities of the tumbler-mold are pressed by the dies 8. The tumbler-mold is then lowered and the tumblers are removed from the mold and sent to the leer.

Although this apparatus may be employed in carrying my process into effect, I do not desire to limit myself thereto, as other apparatus may be substituted therefor.

In Figs. 5, 6, and 7, I show molds and plungers adapted to the manufacture of twelve salt-cellars at one operation, the font 50 having twelve apertures communicating with a like number of mold-cavities in the mold-sections 51 and 52, the cavities in the bottom section 52 being of the form and design of the finished salt-cellars. In operation the glass is forced into the cavities of the mold-sections 51 and 52 in the manner already described—that is, by the piston 38 carrying the font and mold-sections against the plunger 6. The mold and font are then lowered and the font is raised by the hand-lever 41 from the mold-section 51 sufficiently to allow of the cutting of the sprues, which being done the font and mold-section are raised by the movement of the shelf 16 and drawn to the forward end of the shelf, leaving the blanks in the cavities of the mold-section 52, and the mold-section 53, having cavities of the form of the upper part of the salt-cellars to be produced, is seated on the mold-section 52. The plunger-head 7, having dies 54 of suitable shape to produce the desired cavities in the salt-cellars, is brought into position by the hand-wheel 9 and the mold is carried up against the plunger, and the dies entering the plastic glass in the mold press it to the shape of the cavities of the mold. The mold is then lowered and the salt-cellars are removed.

By other variations in the molds and apparatus other articles of glassware may be pressed in a similar manner.

The advantages of my invention will be apparent to those skilled in the art. Its chief advantage is that a number of finished articles may be formed by a single series of operations, thereby reducing the time, labor, and expense heretofore required in pressing articles of glassware.

I do not in this application make any claim to the apparatus described, as part of the same forms the subject-matter of an application already filed by me, and part forms the subject-matter of an application to be filed.

Having thus described my invention, what I claim, and desire to secure by Letters Patent, is—

1. The process of manufacturing articles of glassware, consisting in pressing a number of blanks from a font in a mold, cutting the sprues between the mold and the font, and pressing the blanks to the shape of the finished article; substantially as described.

2. The process of manufacturing articles of glassware, consisting in pressing a number of blanks from a font in a mold, cutting the sprues, removing a part of the mold and substituting another part therefor, and pressing the blanks to the shape of the finished article; substantially as described.

In testimony whereof I have hereunto set my hand.

DANIEL C. RIPLEY.

Witnesses:
W B. CORWIN,
H. M. CORWIN.